(12) United States Patent
Hartwell et al.

(10) Patent No.: US 6,504,385 B2
(45) Date of Patent: Jan. 7, 2003

(54) THREE-AXIS MOTION SENSOR

(75) Inventors: Peter G. Hartwell, Sunnyvale, CA (US); Donald J. Fasen, Boise, ID (US)

(73) Assignee: Hewlett-Pakcard Company, Palo Alto, CA (US)

(*) Notice: Subject to any disclaimer, the term of this patent is extended or adjusted under 35 U.S.C. 154(b) by 0 days.

(21) Appl. No.: 09/867,666

(22) Filed: May 31, 2001

(65) Prior Publication Data
US 2002/0180462 A1 Dec. 5, 2002

(51) Int. Cl.[7] ................................................. G01P 9/04
(52) U.S. Cl. ..................... 324/662; 324/661; 73/514.32; 73/514.18
(58) Field of Search .................. 73/514.32, 514.18; 361/280; 324/661, 662, 609, 658

(56) References Cited

U.S. PATENT DOCUMENTS 5,992,233 A * 11/1999 Clark ......................... 361/280
6,158,280 A * 12/2000 Nonomura et al. ........ 73/504.04
6,373,265 B1 * 4/2002 Morimoto et al. .......... 324/661

\* cited by examiner

*Primary Examiner*—N. Le
*Assistant Examiner*—Vincent Q. Nguyen

(57) ABSTRACT

A microelectromechanical system (MEMS) motion sensor is disclosed for detecting movement in three dimensions of a semiconductor wafer structure. The MEMS device has top, middle, and bottom layers, with a mover attached to the middle layer by a flexure that allows the mover to move in three dimensions relative to the layers. The mover has mover electrodes that create a capacitance with counter electrodes positioned on an adjacent layer. The capacitance changes as the mover moves. A capacitance detector receives signals from the electrodes and detects movement of the mover based on the change in capacitances. The MEMS device processes the detected capacitances to determine the nature of the movement of the mover. The mover and counter electrodes comprise x-y electrodes for detecting movement in an x-y plane parallel to the middle layer and z electrodes for detecting movement in a direction orthogonal to the x-y plane.

20 Claims, 4 Drawing Sheets

THREE-AXIS MOTION SENSOR

FIELD OF INVENTION

The present invention relates generally to motion sensing systems for detecting motion on an apparatus caused by an external force. More particularly, it relates to a microelectromechanical system (MEMS) motion sensor for detecting movement of a portion of a semiconductor wafer system, by detecting a capacitance that varies with movement of the apparatus.

BACKGROUND

In the field of electronic measurement devices and other devices, it is desirable to determine when an apparatus is physically moved by an external force, or other force on the device. It is also desirable to determine the nature of the force, including such properties as the direction and strength of the force using a compact and inexpensive motion sensing device positioned on the apparatus. Various measurement systems detect forces exerted on a body. For example, it may be desirable to measure forces caused by earthquakes, by gravitational forces between stellar bodies, by vehicle movements, by persons acting on an object, or by any number of other sources. Systems exist for sensing such motion in one or two dimensions but cannot effectively sense motion in three dimensions.

Existing motion-sensing systems include systems used in accelerometers in vehicles and systems used in computer or video game input devices, such as joy sticks. Such systems sense motion in two dimensions using capacitance-based motion sensors that identify changes in movement based on changes in a capacitance. Opposing electrodes are positioned on a stationary portion of the device and a moveable portion of the device, and a capacitance is detected between the electrodes. The capacitance changes as the moving portion moves. Existing systems can sense movement in one or two dimensions using a single moving mass, but cannot sense movement in three dimensions using that same mass. Existing systems detect three-dimensional movement using multiple moving masses to create combinations of one-or two-dimensional motion sensors. This complicates the hardware design for determining the movement and consumes valuable space on the electronic device's semiconductor wafer(s).

What is needed is a compact and inexpensive system for sensing movement of an apparatus in three dimensions. In particular, what is needed is a MEMS device for sensing three dimensional movement of an apparatus using a minimal amount of space and using a minimal number of moving parts.

SUMMARY OF INVENTION

A microelectromechanical system (MEMS) motion sensor is disclosed for detecting movement in three dimensions of a semiconductor wafer structure. The MEMS device has top, middle, and bottom layers, with a mover attached to the middle layer by a flexure that allows the mover to move in three dimensions relative to the layers. The system may be part of a semiconductor chip, such as a processor in an electronic device. The mover has mover electrodes that create a capacitance with counter electrodes positioned on an adjacent layer. The capacitance between the electrodes changes as the mover moves. A capacitance detector receives signals from each of the electrodes and detects movement of the mover based on the change in capacitances. The MEMS device processes the detected capacitances to determine the nature of the movement of the mover.

The mover and counter electrodes comprise x-y mover and counter electrodes for detecting movement in an x-y plane parallel to the middle layers, and z mover and counter electrodes for detecting movement in a direction orthogonal to the x-y plane. In one embodiment, the mover is connected to the middle layer by flexures that control movement of the mover by allowing the mover to move in three dimensions while urging the mover back to a static position. Each of the layers may be a separate semiconductor wafer.

A three-wafer MEMS device is also disclosed for detecting forces acting on the device. In the three-wafer device, each of the layers may be a separate semiconductor wafer, with the mover attached to the middle wafer. The MEMS device may have counter electrodes positioned on both the upper and lower wafers, together with corresponding mover electrodes.

DETAILED DESCRIPTION

Figure 1:
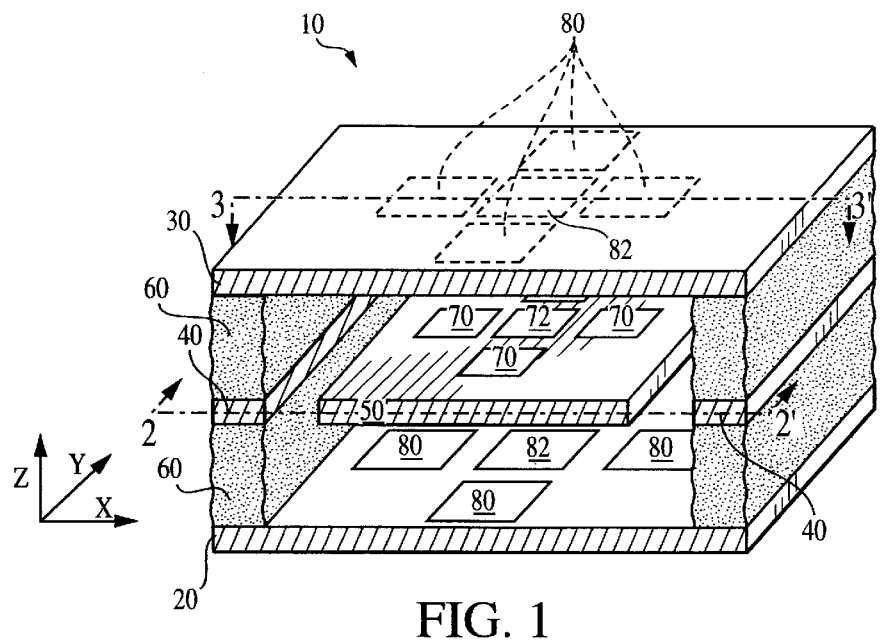
FIG. 1 shows a perspective view of a three-layer semiconductor wafer MEMS device.

FIG. 1 shows a microelectromechanical system (MEMS) device 10 for detecting motion using capacitor plates, or electrodes, to detect movement of a suspended mover. The MEMS device 10 may be encapsulated in a protective shell (not shown) as part of an integrated circuit chip. A middle layer 40 is positioned between an upper layer 30 and a lower layer 20 and connected to each with a connecting material 60. The layers 20,30,40 may be, for example, semiconductor wafers. In one embodiment, each of the layers 20,30,40 is a separate semiconductor wafer and the connecting material is a wafer bond 60. In other embodiments, each of the layers 20,30,40 may be part of a single semiconductor wafer or may be part of two or more wafers.

The middle layer 40 has a mover 50, which may be any mass positioned between the lower and upper layers 20,30 capable of moving relative to the lower and upper layers 20,30. In one embodiment, the mover 50 is a semiconductor wafer portion of the middle layer 40 and is capable of moving in three dimensions relative to the lower and upper layers 20, 30. A three-wafer embodiment maybe used to provide a greater mass to the mover 50. When the MEMS device 10 is moved, for example by an external force, the mover 50 moves relative to the lower and upper layers 20, 30.

The system 10 detects motion of the mover 50 by measuring capacitance values from capacitors formed between electrodes 70,72 on the mover 50 and electrodes 80, 82 on the lower and/or upper layers 20,30. The mover 50 has at least one mover electrode 70,72. The lower or upper layer 20,30 has at least one counter electrode 80,82. In one embodiment, each mover electrode 70,72 has a counter electrode 80,82. The MEMS device 10 detects a capacitance between each mover electrode 70, 72 and counter electrode 80, 82. The overlap of the electrodes creates a capacitor that changes in capacitance depending upon the position of the mover 50, based on the equation $$C \propto \frac{\varepsilon_0 \cdot A}{d},$$

where C is the capacitance, $\varepsilon_o$ is the dielectric constant, A is the area of overlap between the mover electrode 70,72 and the counter electrodes 80, 82, and d is the distance between the mover electrode 70,72 and the counter electrode 80,82. The capacitance detected between a mover electrode 70, 72 and a counter electrode 80,82 changes based on the position of the mover 50. In the example of FIG. 1, the distance between the electrodes 70, 80 changes as the mover 50 moves in the z direction, and the area of overlap between the electrodes 70,80 changes as the mover moves in an x or y direction. In the embodiment shown in FIG. 1, the electrodes 70,72,80,82 are shown as separate elements attached to the mover 50 or to an adjacent layer 20,30. In other embodiments, the electrodes 70,72,80,82 may be defined regions within the mover 50 or the layers 20, 30 formed, for example, by a doping process that creates isolated wells.

In the embodiment shown in FIG. 1, the mover 50 has five mover electrodes 70,72 on both the top and the bottom surfaces of the mover 50. Five counter electrodes 80,82 are located on the lower and upper layers 20, 30. The electrodes 70, 72, 80, 82 are connected to a capacitance detector (not shown) having suitable circuitry to measure the capacitance. As shown in FIG. 1, the mover 50 may move in three dimensions, x, y, and z, where z is the vertical dimension between the plates 20, 30. As the mover 50 moves in the x and y dimensions, the area of overlap between some or all of the corresponding electrodes 70,80 changes, causing a change in capacitance. As the mover 50 moves in the z dimension, the distance between the electrodes 70,72,80,82 changes, causing a change in capacitance. The circuitry detects these changes for each electrode 70, 72, 80, 82. Based on each of the capacitances, the MEMS device 10 determines that the mover 50 has moved and the direction of movement.

Figure 2:
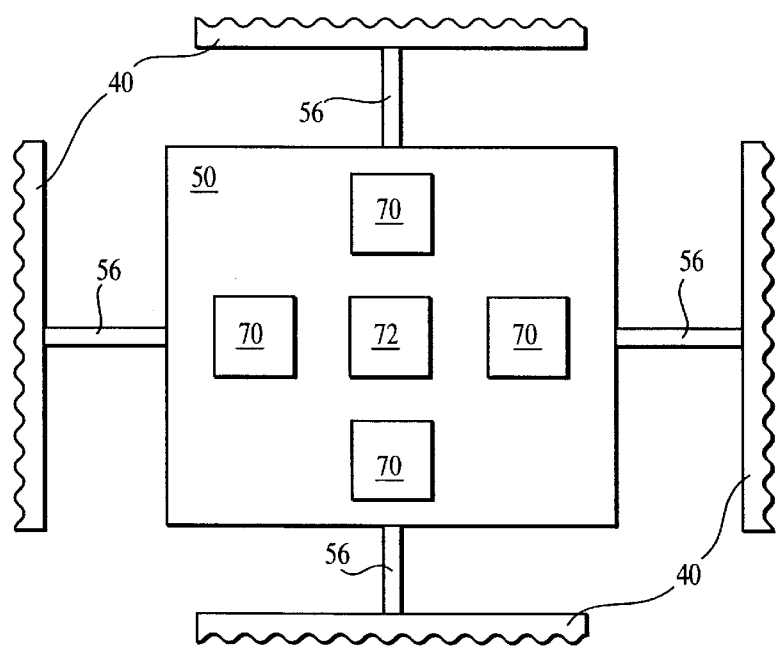
FIG. 2 shows a cross-section of the MEMS device shown in FIG. 1 taken along the line 2—2', showing a top view of a mover.

FIG. 2 shows a cross-section view of the MEMS device 10 taken along the line 2–2' in FIG. 1, showing a top view of the mover 50. Five mover electrodes 70, 72 are shown positioned on the top of the mover 50. The mover 50 is connected to the middle layer 40 by connectors 56, also referred to as flexures 56. The flexures 56 allow the mover 50 to move in three dimensions relative to the lower, middle, and upper layers 20,30,40, while urging the mover 50 back to a static position of mechanical equilibrium. Flexures 56 may be made from the same material as the middle layer 40 and the mover 50, and may be a micro-machinable material such as silicon. Any number of flexures 56 may be used to connect the mover 50 to the middle layer 40. Each side of the mover 50 may have one or more flexures 56, or none at all.

Figure 3:
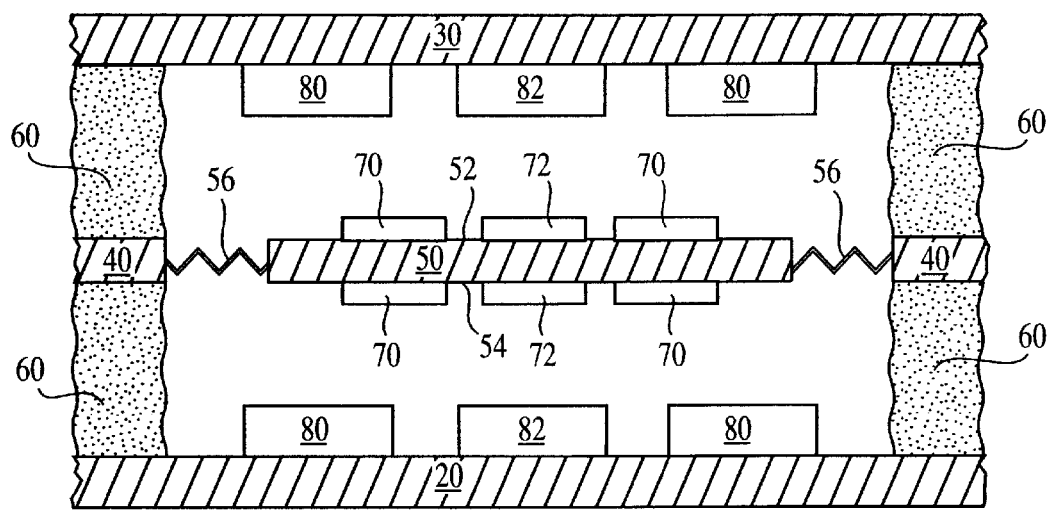
FIG. 3 shows a cross-section of the MEMS device shown in FIG. 1 taken along the line 3—3'.

FIG. 3 shows a cross-section of the MEMS device 10 taken along the line 3–3' shown in FIG. 1. The mover 50 is connected to the middle layer 40 by flexures 56. The mover 50 has a top surface 52 facing the upper layer 30 and a bottom surface 54 facing the lower surface 20. In the embodiment shown, the mover 50 has mover electrodes 70, 72 disposed on both the top and bottom surfaces 52,54. In this embodiment, capacitances may be determined for pairs of electrodes 70,72,80,82 on both sides of the mover 50 to provide data for a differential electronics scheme, which may be used by the capacitance detector (not shown), to determine movement based on changes in capacitances detected between each of the pairs of electrodes 70,80. The layers 20,30,40 are connected with connecting material 60. A capacitance is created between the mover electrodes 70,72 and the counter electrodes 80, 82. As the mover 50 moves relative to the upper and lower layers 20, 30, the capacitances change due to changes in the distance between the electrodes 70, 72, 80, 82 and/or the area of overlap between the electrodes 70, 72, 80, 82.

Figure 4:
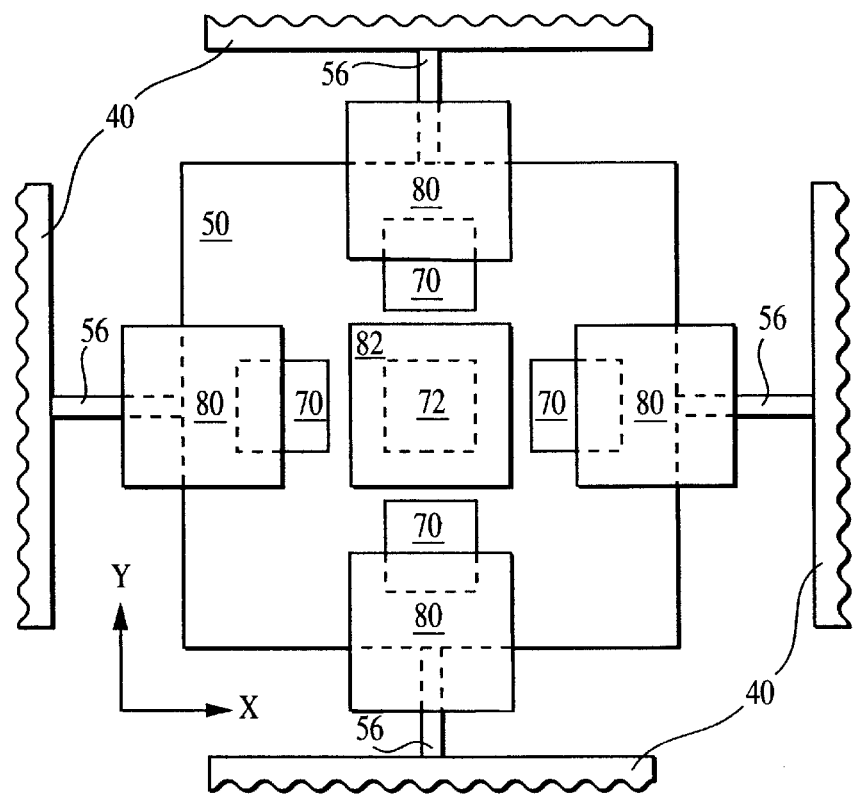
FIG. 4 shows a top view of the mover showing the relation between electrodes in an initial position

FIG. 4 shows a top view of the mover 50 showing the overlap of the counter electrodes 80,82 with the mover electrodes 70,72. In the embodiment shown in FIG. 4, the mover 50 has five mover electrodes 70, 72 and five counter electrodes 80, 82. In one embodiment, the center counter electrode 82 may be used primarily to determine whether the distance between the electrodes 70,72,80,82 changes indicating movement along the z axis. The center counter electrode 82 may be referred to as the z counter electrode 82, and the center mover electrode 72 may be referred to as the z mover electrode 72. As used herein, the terms z electrode 72, 82, z counter electrode 82, and z mover electrode 72 refer to any electrode that capable of detecting movement in a direction outside of the plane of the middle layer 40, regardless of whether or not that direction is orthogonal to the middle layer 40 and regardless of whether the movement is detected by a change in distance between electrodes 72, 82, a change in area of overlap between electrodes 72, 82, or any other change in capacitance. Pairs of mover electrodes 70,72 and counter electrodes 80,82 may be referred to as capacitors. Pairs of z electrodes 72, 82 may be referred to as z capacitors. The z electrodes 72, 82 may be used primarily to detect movement in the z direction. In this embodiment, z electrodes 72, 82 may be designed such that the capacitance between them does not change substantially as the mover 50 moves in the x or y directions. For example, the z mover electrode 72 may be smaller than the z counter electrode 82 (or vice-versa) such that the area of overlap does not change as the mover 50 moves in the x and y directions.

In the embodiment shown in FIG. 4, the outer counter electrodes 80 have an area of overlap with corresponding outer mover electrodes 70. These electrodes 70, 80 may be referred to as x-y counter electrodes 80 and x-y mover electrodes 70 because they detect movement in the x-y plane—that is, movement that is substantially parallel to a plane defined by the middle wafer 40. As used herein, the terms x-y electrode 70,80, x-y counter electrode 80, and x-y mover electrode 70 refer to any electrode that capable of detecting movement lateral to the middle layer 40, that is, in a direction generally within the plane of the middle layer 40 or parallel to said x-y plane, regardless of whether the movement is detected by a change in distance between electrodes 70,80, a change in area of overlap between electrodes 70,80, or any other change in capacitance. Pairs of x-y electrodes 70,80 may be referred to as x-y capacitors. The MEMS device 10 detects a change in capacitance caused by a change in the area of overlap between the x-y counter electrodes 80 and the x-y mover electrodes 70. In one embodiment, x-y capacitors include x capacitors having an area of overlap that changes only with movement in the x direction, and y capacitors having an area of overlap that changes only with movement in the y direction. As with the z electrodes 72,82, this may be done, for example, by making the surface area (or one dimension of the surface area) of the x-y mover electrode 70 small relative to the x-y counter electrode 80 (or vice-versa), such that the area of overlap does not change as the mover 50 moves in a particular direction. In the embodiment shown in FIG. 4, multiple x-y capacitors are positioned relative to various portions of the mover 50 to improve the detection of movement by the capacitance detector, although any number of x, y, and z capacitors may be used.

Movement of the mover 50 may not be directly aligned with one of the x, y, z axes, as defined, but might instead have vector components in all three dimensions. As used herein, references to the axes and planes are for convenience only and refer to any movement or any vector component of such movement along a particular axis or within any particular plane. For example, the terms such as "movement in an z direction," "movement along the x axis," or "movement in the x-y plane" refer to any vector component of movement that can be normalized along any chosen axis. The MEMS device 10 may determine the nature of movement in all three dimensions by detecting components of that movement based on changes in capacitances between mover and counter electrodes 70, 72, 80, 82.

A capacitance detector (not shown) may be used to determine the nature of the movement based on capacitances detected between each electrode 70, 72, 80, 82. In the example of FIG. 4 using four x-y counter electrodes 80 and corresponding mover electrodes 70, the capacitance detector might detect increases in two of the capacitances and decreases in the other two, indicating an x-y movement diagonally to the axes. In the example shown, capacitance detected at the x-y counter electrodes 80 will also vary with movement in the z direction, because the distance between the x-y electrodes 70, 80 will change. The capacitance detector can separate x-y movement from z movement by considering the difference in capacitance caused only by movement in the z direction, which for example, can be determined from a pair of z electrodes 72, 82. By determining z movement, the capacitance detector can separate changes on the x-y capacitors attributable to x-y movement, as opposed to movement in the z direction. In FIG. 4, the MEMS device 10 is shown in a static position in which the overlap area for each of the x-y electrodes 70,80 is substantially the same. As the mover 50 moves, the overlap area changes for one or more of the x-y electrodes 70,80.

Figure 5:
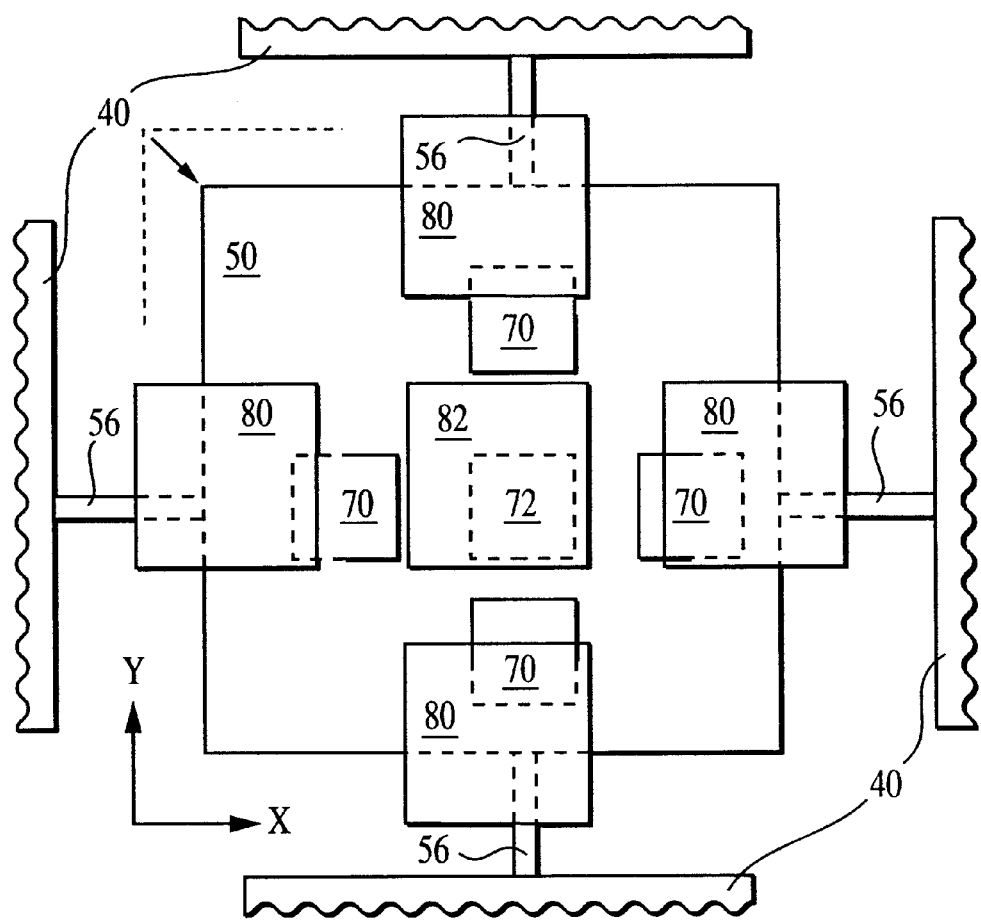
FIG. 5 shows a top view of the mover of FIG. 4 after the mover has moved.

FIG. 5 shows the same view as FIG. 4, after the mover 50 has moved relative to other layers 20,30,40. In the example of FIG. 5, the mover 50 has moved down and to the right, in the x and y directions according to the example reference axes. As the mover 50 moves, the area of overlap of the x-y mover electrodes 70 and the x-y counter electrodes 80 changes for each electrode. This change in overlap area causes a change in capacitance at the x-y electrodes 70,80, which can be detected by the capacitance detector. In the embodiment shown in FIG. 5, after movement of the mover 50, the z mover electrode 72 does not overlap with any of the x-y counter electrodes 80 and still overlaps completely with the z counter electrode 82 because the surface area of the z mover electrode 72 is small relative to the surface area of the z counter electrode 82. In this embodiment, the capacitance detected between the z electrodes 72, 82 may be substantially constant as the mover 50 moves in the x and y dimensions and may be used primarily to detect movement in the z direction—that is, movement that changes the distance between the electrodes 72, 82 rather than the overlap area.

Figure 6:
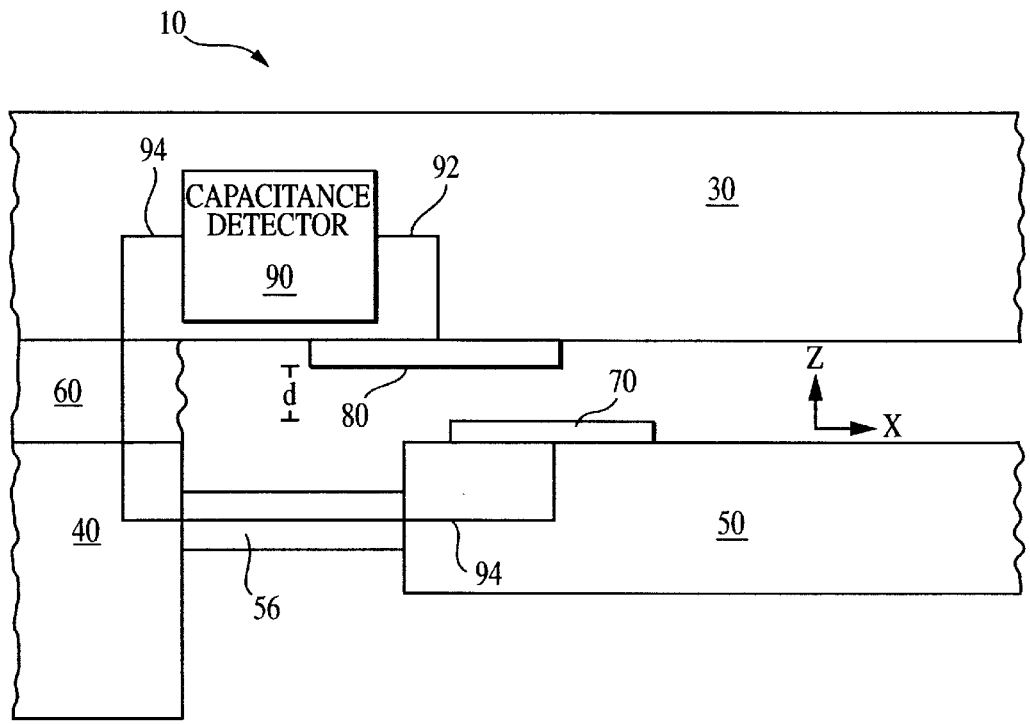
FIG. 6 shows a diagram of the connections between the electrodes and the capacitance detector.

FIG. 6 shows a diagram of the capacitance detection system of the MEMS device 10. The counter electrode 80 and the mover electrode 70 are separated by a distance d and have an area of overlap. An electrode connector 92 connects the counter electrode 80 to a capacitance detector 90. A similar electrode connector 94 connects the mover electrode 70 to the capacitance detector 90. The electrode connectors 92, 94 may connect to the capacitance detector 90, for example, through the flexures 56 and connecting material 60. The capacitance detector 90 is any circuitry capable of determining the capacitance. In the embodiment shown, the electrode connector 94 from the mover electrode 70 is shown passing through the flexure 56. In other embodiments, the electrode connector 94 may not pass through the flexure 56, but may instead have a separate connection, for example, passing along side the flexure 56. In still other embodiments, the electrode connector 94 may use a wireless connection to connect to the capacitance detector 90.

The capacitance detector 90 comprises hardware capable of determining the capacitance detected between the electrodes 70, 72, 80, 82. As used herein, capacitance detector 96 refers to any hardware or software system for determining the capacitance between two electrodes, such as the counter electrode 80, 82 and the mover electrode 70, 72. In one embodiment, multiple mover electrodes 70, 72 and counter electrodes 80, 82 are used, and the capacitance detector 90 receives inputs from some or all of these electrodes to determine the capacitance detected between the electrodes 70, 72, 80, 82, using, for example, a differential electronics scheme. In this embodiment, the capacitance detector 90 may be a processor that determines the position of the mover 50 or the nature of the movement. In another embodiment, multiple capacitance detectors 90 are used, each of which determines the capacitance between a pair of electrodes 70, 80 and sends information about the capacitance to a separate processor (not shown). In the embodiment shown, the capacitance detector 90 is located in the upper layer 3 0, receiving the electrode connector 94 from the mover electrode 70 through the middle layer 40 and the connecting material 60. In one embodiment, the capacitance detector 90 uses an open-loop system that passes an AC signal through the electrodes 70, 80 to measure the capacitance. Another embodiment uses a closed-loop system in which electrodes 70, 72, 80, 82 may be used as capacitors or actuators in a feedback loop to create an error signal based on movement of the mover 50, which error signal may be proportional to such movement. One skilled in the art will understand that the capacitance detector 90 may use various methods to detect capacitance and may be positioned in various locations, as part of or separate from the MEMS device 10, as desired.

Figure 7:
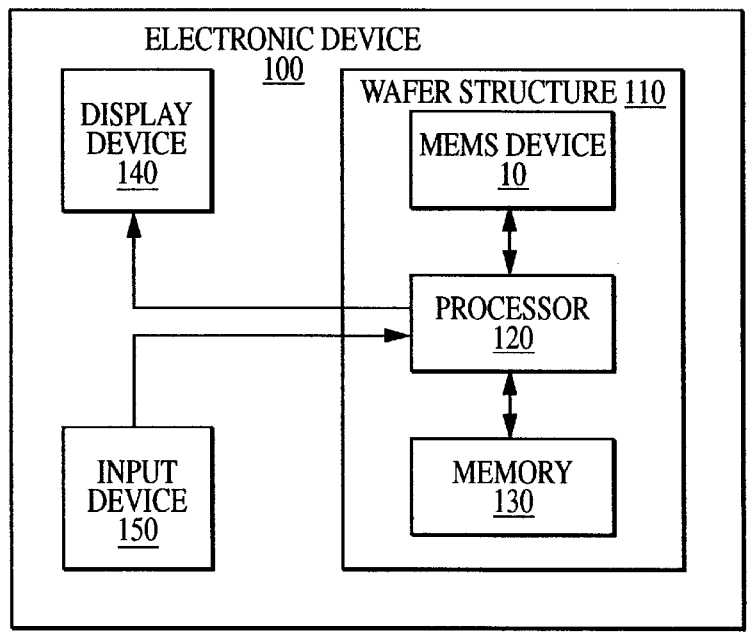
FIG. 7 shows a block diagram of an apparatus that uses the MEMS device.

FIG. 7 shows a block diagram of an apparatus 100 that uses the MEMS device 10. The apparatus 100 may be, for example, an electronic device 100 that uses a semiconductor wafer structure 110 for various purposes. The electronic device 100 may have a display device 140 for displaying information and an input device 150 for receiving input information. The electronic device 100 may process input and output information using a processor 120. In the embodiment shown in FIG. 7, the processor 120 is part of the wafer structure 110 and is connected to the MEMS device 10. In the embodiment shown in FIG. 7, the wafer structure 110 also contains a memory 130 connected to the processor 120. In the embodiment shown, a single wafer structure 110 is used for the MEMS device 10, the processor 120, and the memory 130. In other embodiments, the processor 120 and/or the memory 130 may be separate from the wafer structure 110 used for the MEMS device 10. In use, movement of the electronic device 100 causes the mover 50 in the MEMS device 10 to move. The MEMS device 10 senses movement of the electronic device 100 and sends a signal to the processor 120. The processor 120 may then take action based on the movement.

In one example, the electronic device 100 may be a personal data assistant, laptop computer, or wireless telephone that shuts down or otherwise "goes to sleep" when not in use. The MEMS device 10 may act as an input device that instructs the processor 120 when a force has acted on the device 100 so that the processor 120 can control the device 100 based on the detected force. The device 100 may turn on when it senses movement, such as the movement of a user picking up the device 100. Upon sensing a movement, the MEMS device 10 may send a signal to the processor 120, which in turn causes the electronic device 100 to turn on.

Although the present invention has been described with respect to particular embodiments thereof, variations are possible. The present invention may be embodied in specific forms without departing from the essential spirit or attributes thereof. In particular, although some embodiments of the system are shown having three semiconductor wafer layers, any number of layers may be used. Although certain geometries and positions of the electrodes are shown, any number of electrodes may be used and may cause changes in capacitance based on changes in area, distance, or both. It is desired that the embodiments described herein be considered in all respects illustrative and not restrictive and that reference be made to the appended claims and their equivalents for determining the scope of the invention.

We claim:

1. A microelectromechanical system (MEMS) device comprising:
   a first layer comprising a counter electrode;
   a second layer disposed adjacent to the first layer, the second layer comprising:
   a middle wafer connected to the first layer; and
      a mover attached to the middle wafer and capable of moving in three dimensions relative to the middle wafer and the first layer, the mover comprising a mover electrode positioned adjacent to the counter electrode and capable of creating a capacitance between the counter electrode and the mover electrode, wherein movement of the mover causes the mover electrode to move relative to the counter electrode, wherein the capacitance varies depending upon the position of the mover; and
   a capacitance detector that detects the capacitance.

2. The device of claim 1, wherein the first layer comprises an x-y counter electrode and the mover comprises an x-y mover electrode, wherein the x-y counter electrode and the x-y mover electrode are used to detect lateral movement in a direction parallel to the middle wafer.

3. The device of claim 1, wherein the mover moves when an external force is exerted on the device.

4. The device of claim 1, where in the device is part of an electronic apparatus and indicates whether the apparatus receives an external force.

5. The device of claim 1, further comprising a third layer disposed parallel to the first and second layer such that the second layer is positioned between the first and third layers.

6. The device of claim 1, wherein the counter electrode is fixedly attached to the first layer.

7. The device of claim 1, wherein the second layer further comprises a flexure that connects the mover to the middle wafer.

8. The device of claim 7, wherein the flexure allows the mover to move in three dimensions and urges the mover back to a static position of mechanical equilibrium.

9. The device of claim 1, wherein the first layer comprises an x-y counter electrode and a z counter electrode and the mover comprises an x-y mover electrode and a z mover electrode, and wherein the mover is capable of movement in three dimensions, the movement being defined by x and y directions defining an x-y plane substantially parallel to the middle wafer and a z direction orthogonal to the x-y plane, and wherein movement in the x or y directions changes a capacitance between the x-y mover electrode and the x-y counter electrode, and wherein movement in the z direction changes a capacitance between the z mover electrode and the z counter electrode.

10. The device of claim 9, wherein movement in the x or y directions changes an area of overlap between the x-y mover electrode and the x-y counter electrode, and wherein movement in the z direction changes a distance between the z mover electrode and the z counter electrode.

11. The device of claim 1, wherein the first layer comprises a z counter electrode and the mover comprises a z mover electrode, wherein the z counter electrode and the z mover electrode are used to detect a movement orthogonal to the middle wafer.

12. The device of claim 11, wherein the capacitance detected on the z counter electrode does not change substantially when the mover moves only in an x-y plane.

13. The device of claim 11, wherein an area of the z counter electrode is larger than an area of the z mover electrode.

14. An electronic device comprising:
   a processor;
   a microelectromechanical system (MEMS) device connected to the processor for sensing movement of the electronic device, the MEMS device comprising:
      a first layer;
      a second layer adjacent to the first layer;
      a mover connected to the second layer, and being co-planar with the second layer, which mover moves laterally in three dimensions relative to the first layer when a force is exerted on the MEMS device;
      a plurality of x-y capacitors for sensing movement of the mover in an x or y direction, each of the plurality comprising:
         an x-y mover electrode connected to the mover; and
         an x-y counter electrode connected to the first layer;
         wherein movement of the mover in an x or y directions causes the x-y mover electrode to move relative to the x-y counter electrode, whereby movement of the mover in the x or y directions changes a capacitance on at least one of the plurality of x-y capacitors; and
      a z capacitor for sensing movement in a z direction, comprising:
         a z mover electrode connected to the mover; and
         a z counter electrode connected to the first layer;
         wherein movement of the mover in the z direction causes the z mover electrode to move relative to the z counter electrode, whereby movement of the mover in the z direction changes a capacitance on the z capacitor.

15. The device of claim 14, further comprising a capacitance detector connected to the plurality of x-y capacitors and to the z capacitor.

16. The device of claim 14, wherein movement of the mover in the z direction changes a distance between the z mover electrode and the z counter electrode, and wherein movement in the x or y direction changes an area of overlap between at least one pair of x-y mover and counter electrodes.

17. A three-wafer microelectromechanical system (MEMS) device for sensing movement in three dimensions comprising:

a first layer comprising a plurality of counter electrodes;

a second layer adjacent to the first layer, comprising
a substrate fixedly connected to the first layer;
a mover connected to the substrate by flexures, wherein the mover and substrate are substantially co-planar and wherein the mover moves relative to the first layer and the substrate;
a plurality of mover electrodes disposed on a first side of the mover, adjacent to the plurality of counter electrodes, wherein a plurality of capacitances are created for pairs of mover electrodes and counter electrodes, and wherein the mover electrodes move in three orthogonal dimensions relative to the plurality of counter electrodes as the mover moves, whereby the capacitances change as the mover moves;

a third layer adjacent to the second layer and fixedly connected to the substrate; and a capacitance detector connected to the plurality of mover electrodes and plurality of counter electrodes, which capacitance detector detects movement of the mover in three dimensions based on capacitances detected between pairs of counter electrodes and mover electrodes.

18. The device of claim 17, wherein the plurality of mover electrodes comprises an x-y mover electrode, and wherein the plurality of counter electrodes comprises an x-y counter electrode, wherein the capacitance between the x-y mover electrode and the x-y counter electrode varies based on a position of the mover in an x-y plane substantially parallel to the first and second layers.

19. The device of claim 17, wherein the plurality of mover electrodes comprises a z mover electrode, and wherein the plurality of counter electrodes comprises a z counter electrode, wherein a capacitance between the z mover electrode and the z counter electrode varies based on a distance between the mover and the first layer.

20. The device of claim 19, wherein the capacitance between the z mover electrode and the z counter electrode remains substantially constant as the mover moves within an x-y plane parallel to the first and second layers.

* * * * *